Patented July 21, 1953

2,646,383

UNITED STATES PATENT OFFICE 2,646,383

ANTHELMINTIC COMPOSITIONS

Arthur Henry Craige, Jr., Plainfield, Ind., assignor to Allied Laboratories, Inc., Kansas City, Mo., a corporation of Delaware No Drawing. Application May 28, 1952,
Serial No. 290,566

11 Claims. (Cl. 167—53)

The present invention relates to anthelmintics and is directed to novel compositions and methods for the elimination of worms from the alimentary tract of higher animals. More particularly, it relates to veterinary anthelmintic compositions containing as one of the active ingredients at least one of the compounds represented by the following general formula:

in which Y and Y' represent phenyl radicals each having at least one halogen substituent and at least one hydroxy substituent and as another essential ingredient, at least one substance commonly used as an anthelmintic or known to have anthelmintic properties.

In accordance with the present invention, it has been discovered that anthelmintic compositions containing as one of the active ingredients a diphenylmethane wherein each of the phenyl groups contains at least one hydroxy substituent and at least one halogen substituent, and as another active ingredient a substance having known anthelmintic properties, possess improved anthelmintic action over the individual ingredients.

It is an advantage of the present invention that my anthelmintic compositions possess a wide range of usefulness, i. e., are effective against internal parasites against which the individual ingredients are less effective.

It is also an advantage of my invention that in my combination of anthelmintic substances, the effective dose is smaller in some instances than is the case when the individual ingredients are used alone.

The compounds which constitute one of the essential ingredients in the compositions of my present application can broadly be classified as diphenylmethanes wherein each of the phenyl group contains at least one halogen substituent and at least one hydroxy substituent. I have found that at least one halogen substituent and at least one hydroxy substituent must be present on the phenyl groups.

Included among the compounds useful in accordance with my invention are the following:

As one of my preferred active ingredients are those compounds represented by the following formula:

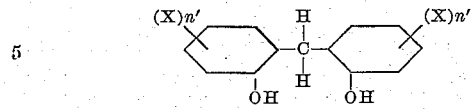

in which X represents a halogen, selected from the group consisting of chlorine and bromine and $n'$ represents 1, 2, 3, or 4 and salts of such compounds. Specific compounds falling within this class include 2,2'-dihydroxy-5,5'-dichlorodiphenylmethane, 2,2'-dihydroxy-5,5'-dibromodiphenylmethane, 2,2'-dihydroxy-3,5,3',5'-tetrachlorodiphenylmethane, 2,2'-dihydroxy-3,5,3',5'-tetrabromo - diphenylmethane 2,2' - dihydroxy-3,5,6,3',5',6' - hexachlorodiphenyl - methane, 2,2'-dihydroxy - 3,4,5,6,3',4',5',6' - octachlorodiphenyl - methane, 2,2' - dihydroxy - 5,5' - bromo-3,6,3',6' - tetrachlorodiphenyl - methane, 2,2'-dihydroxy - 3,5,6,3',5',6' - hexabromodiphenylmethane and their salts including alkali metal, alkaline earth metal, and heavy metal salts.

Among those compounds having more than one hydroxy group on the phenyl rings may be included 2,4,2',4' - tetrahydroxy - 5,5' - dichlorodiphenylmethane, 2,4,6,2',4',6' - hexahydroxy-5,5' - dichlorodiphenylmethane, 2,4,2',4'-tetrahydroxy - 3,5,3',5' - tetrachlordiphenylmethane and the corresponding bromo compounds.

As previously pointed out, the other essential active ingredient in my anthelmintic compositions is at least one other substance commonly used as an anthelmintic or is known to have anthelmintic action when administered internally to warm-blooded animals. Among such substances may be included phenothiazine, kamala, oil of chenopodium, carbon tetrachloride, butyl chloride, arecoline, nicotine sulfate, hexylresorcinal, thymol, lead arsenate, copper sulfate, tartar emetic, quassia, santonin, tetrachloroethylene, carbon disulfide, oleo-resin of aspidium, arsenic trioxide, turpentine, chloroform, hexachlorethane, antimony potassium tartrate, pelleterine and the like.

The following specific description of experiments carried out will serve to illustrate the effectiveness of my anthelmintic compositions. The descriptions are solely for purposes of illustration and are not to be construed as limiting the scope of the invention.

Proof of the anthelmintic activity of my compositions against gastro-intestinal parasites of warm-blooded animals was obtained in two types of tests, (1) killing worms in artificial media (in vitro) and (2) eliminating worms from infected animals (in vivo).

In the in vitro tests active ascarids, recently removed from the intestines of dogs or from hogs, were placed in flasks containing 200 cc. of physiological saline solution at 37° C. and maintained at this temperature for the test period. To these flasks were added the test anthelmintic in quantity to produce the desired concentration, and the activity of the worms was observed at intervals until all evidence of life had disappeared. Suitable controls were prepared for comparison with the test group. A representative experiment is summarized in the following table.

The reliability of this method for establishing the presence of infection was found to be 100%. Dogs thus shown to be infested were given an oral dose of the test anthelmintic and were observed closely during the following period until they were killed, 48–96 hours after the dose had been given. During this interval, their feces were screened for worms or fragments of worms. After death, the entire gastro-intestinal canal of each dog was slit open and examined closely for the presence of parasites remaining after treatment. The taenicidal action is summarized in the following table.

*Summary of in vivo experiments on taenicidal action*

| Anthelmintic Composition | Dosage, Mg./Kg. | No. Dogs | Results—Based on post-mortem findings, Taenicidal Action ||||||
|---|---|---|---|---|---|---|---|---|
| | | | Complete || Partial || None ||
| | | | No. Dogs | Percent | No. Dogs | Percent | No. Dogs | Percent |
| Kamala | 50 | 8 | 1 | 13 | 3 | 38.0 | 4 | 50.0 |
| Kamala and PT-70* | { 50 / 200 } | 8 | 8 | 100 | | | | |
| Oil of Chenopodium (cc.) | 0.01 | 4 | | | | | 4 | 100.0 |
| Oil of Chenopodium (cc.)+PT-70* | { 0.01 / 200 } | 9 | 8 | 89 | 1 | 11.0 | | |
| N-butyl chloride (cc.) | 0.5 | 7 | 5 | 71.0 | 2 | 29.0 | | |
| N-butyl chloride (cc.)+PT-70* | { 0.5 / 200 } | 8 | 7 | 87.0 | 1 | 13.0 | | |

*PT-70 represents 2,2'-dihydroxy-5,5'-dichlorodiphenylmethane.

Taenicidal action by the representative members of my class of anthelmintics as shown in

*In vitro experiments with hog ascarids*

[Period (hours: minutes) to produce various degrees of depression with known anthelmintics, alone and combined with PT-70*, 0.05 gm./l.]

| Anthelmintics | Conc. per l. | Beginning depression || Marked depression || Beginning inactivity || Complete inactivity ||
|---|---|---|---|---|---|---|---|---|
| | | alone | +PT-70 | alone | +PT-70 | alone | +PT-70 | alone | +PT-70 |
| PT-70 (gm.) | 0.05 | 17–24 | | 17–24 | | 24–46 | | 24–48 | |
| | 0.25 | 1–2 | | 2–17 | | 2–17 | | 24–48 | |
| | 0.50 | :30–1 | | :30–1 | | 2–20 | | 2–20 | |
| Oil of Chenopodium (cc.) | 0.05 | :15 | :15 | :15 | :15 | :30 | :15 | 1 | 1 |
| | 0.50 | :05 | :03 | :15 | :03 | :30 | :15 | 1 | :45 |
| | 5.00 | :15 | :15 | :15 | :15 | :15 | :15 | :40 | :25 |
| CCl₄ (cc.) | 0.05 | 1 | :15 | 1 | 1 | 2 | 2 | 24 | 20 |
| | 0.50 | 1 | 1 | 1 | 1 | 2 | 1 | 2 | 20 |
| | 5.00 | 1 | 1 | 2 | 1 | 2 | 2 | 20 | 2 |
| C₂Cl₄ (cc.) | 0.05 | 2 | 1 | 2 | 1 | 24 | 2 | 24 | 20 |
| | 0.50 | 1 | :30 | 20 | 1 | 20 | 2 | 24 | 20 |
| | 5.00 | 2 | :30 | 2 | :30 | 2 | 1 | 20 | 20 |
| C₄H₉Cl (cc.) | 0.05 | 1 | :05 | 17 | :05 | 48 | 16 | 48 | 48 |
| | 0.25 | 24 | :15 | 48 | 16 | 48 | 16 | 48 | 24 |
| Phenothiazine (gm.) | 0.50 | :30 | :15 | 17 | :30 | 17 | 24 | 48 | 48 |
| | 2.00 | :30 | :30 | 48 | :30 | 48 | 18 | 24 | 24 |
| Santonin (gm.) | .005 | :05 | :08 | :15 | :15 | :15 | :15 | 24 | 20 |
| | .050 | :15 | :05 | :15 | :15 | 1 | :15 | 24 | 20 |

Test group active, recently collected specimens of *Ascaris lumbricoides* in 200 cc. saline (NaCl, 0.85%) at 37° C.
*PT-70 represents 2,2'-dihydroxy-5,5'-dichlorodiphenylmethane.

The results as set forth in the above table show that the combination of 2,2'-dihydroxy-5,5'-dichlorodiphenylmethane, when combined with the various other anthelmintics possessed a greater ascaricidal action than the individual known anthelmintic substances when used alone. This is especially true where the lower dose ranges were employed. Similar results were obtained when the other diphenylmethanes enumerated on the preceding pages of this specification were used instead of 2,2'-dihydroxy-5,5'-dichlorodiphenylmethane.

To illustrate the ascaricidal and taenicidal properties of my compositions, in vivo experiments were carried out on dogs. In these experiments, natural infections were determined in a series of dogs by repeated daily examination of these feces for segments of tapeworms or roundworms.

the above table was indicated in the majority of cases by complete absence of tapeworms from the gastro-intestinal tract. In a few instances, however, there was distinct evidence of action, yet a few worms remained. These were usually free in the lumen of the bowel, rather than attached to the wall, as is normal for the dog tapeworms; and in some cases, the worms showed unmistakable evidence of degeneration. These cases are listed in the above table as indicating "partial" taenicidal action, which is to be interpreted as a distinct action by only partial elimination in the period of time allowed. It is noted that in every instance my compositions showed a greater taenicidal action than kamala, oil of chenopodium or N-butyl chloride when used alone.

In in vivo experiments showing ascaricidal properties of a representative group of my anthelmintic compositions are summarized in the following table.

*In vivo experiments (ascaricidal)*—Ascaricidal Action of PT-70[1] and mixtures of PT-70[1] and various anthelmintics in dogs

| No. Dogs | PT-70[1] mg./Kg. | Known Anthelmintic | Ascaricidal Action (based on autopsy findings) | | Percent dogs, complete ascarid elimination |
|---|---|---|---|---|---|
| | | | Present | Absent | |
| 13 | 150-200 | | 10 | 3 | 23.0 |
| 5 | 0 | Oil of chenopodium, 0.01 cc./Kg. | 2 | 3 | 60.0 |
| 6 | 200 | Oil of chenopodium, 0.01 cc./Kg. | 0 | 6 | 100.0 |
| 1 | 0 | N-butyl chloride, 0.5 cc./Kg. | 1 | 0 | 0.0 |
| 7 | 200 | N-butyl chloride, 0.5 cc./Kg. | 3 | 4 | 57.0 |
| 3 | 200 | Kamala, 50 mg./Kg. | 0 | 3 | 100.0 |

[1] PT-70 represents 2,2'-dihydroxy-5,5'-dichlorodiphenylmethane.

In the foregoing tests representative members of my class of anthelmintic compositions were employed. I am convinced, however, that the entire class are useful as anthelmintics, it being expected, of course, that the degree of activity will vary from compound to compound and from species to species. The Platyhelminthes, illustrated by dog tapeworms, and the Coelhelminthes, illustrated by hog ascarids and dog ascarids are likewise only specific illustrations. During toxicity studies in mice, some of them passed mouse tapeworms in their feces which further illustrates the effectiveness of my anthelmintic compositions in another species of warm-blooded animals.

Toxicity studies indicate that the therapeutic ratios of my compositions are very favorable, and it is not anticipated that the effective doses will produce any untoward effects.

It is evident that my anthelmintic compositions may be varied in form depending somewhat upon the warm-blooded animal to which it is to be administered. Hence, they may be in the form of pills, tablets, capsules, boluses, powders, effervescent mixtures, drenches, aqueous suspensions, oil solutions, aqueous solutions of the alkali metal or alkaline-earth metal salts solutions or suspensions in non-toxic organic solvents or mixed with food or salt.

The active ingredients in my preferred anthelmintic compositions can be varied from about 2 per cent to 98 per cent, and the other ingredients including vehicles, carriers, etc. from 98 per cent to 2 per cent. When my anthelmintics are to be administered by way of food or drinking water, it is preferred that the active ingredients constitute a proportion such that an adequate dose will be obtained by the animals consuming the food, the percentage may in these cases, therefore, be only a fraction of a per cent or several per cent.

It is to be distinctly understood that my veterinary anthelmintic compositions are useful for combating internal parasites of the gastro-intestinal tract of any domestic animal or fowl.

It is likewise understood that the essential active ingredients in my anthelmintic compositions may be used in varying proportions. In some cases, I prefer to employ my novel diphenylmethane anthelmintic compounds as the major active constituent and the known anthelmintic compound as a minor active constituent. In other cases, the known anthelmintic may constitute the major active constituent and the diphenylmethane the minor active constituent. In other cases, they may be present in substantially equivalent proportions.

In all cases, the said essential active ingredients must be present in such proportions that upon administration to domestic animals or poultry, an effective but non-toxic dose of each of the essential active ingredients will be administered. It is seen, therefore, that in my compositions the dihydroxy halogenated diphenylmethane substances must be present in an amount sufficient alone to produce an anthelmintic effect and less than that which alone produces toxic effects; and similarly, at least one other substance having an anthelmintic effect must be present in an amount sufficient alone to produce an anthelmintic effect and less than that which alone produces toxic effects.

In specific instances, the compound 2,2'-dihydroxy-5,5'-dichlorodiphenylmethane produces a desirable anthelmintic effect when administered in a dosage range from about 50 mg./kg. to about 300 mg./kg. of body weight. Preferably, a dose of about 200 mg./kg. is employed. The compound 2,2' - dihydroxy - 3,5,6,3',5' - 6' - hexachlorodiphenylmethane produces a desirable anthelmintic effect when administered in a dose of from about 30 mg./kg. to about 60 mg./kg.; the preferred dose in most cases being about 50 mg./kg. It is seen, therefore, that the dihydroxy halogenated diphenylmethane in my veterinary anthelmintic compositions must be present in a quantity to provide a dose within the range of from 30 mg./kg. to 300 mg./kg. and at least one other substance having an anthelmintic action must be present in a quantity sufficient alone to produce an anthelmintic effect and less than that which alone produces a toxic effect.

In conjunction with the dihydroxy halogenated diphenylmethane substance, and as another essential active ingredient in my veterinary anthelmintic compositions, I include at least one other substance which is known to have an anthelmintic action when administered to domestic animals or poultry. These other anthelmintic substances are present in my compositions in such proportions that they will provide a useful but non-toxic dose. The doses of these other substances are well known to persons skilled in the art, and particularly to veterinarians. The dose of different anthelmintic substances varies somewhat depending upon the species and age of the animal being treated; for example, the Fifth Edition of Veterinary Pharmacology, Materia Medics, and Therapeutics, by H. J. Milks, D. V. M., gives the following dosage recommendations for some of the substances commonly used as veterinary anthelmintics:

Arecoline hydrobromide, used as a vermifuge for tapeworms in dogs, is administered at the dose rate of from 1/12 to 1 gr. per dog, or at the rate of 0.0015 gm./kg. of body weight.

Kamala, used as a remedy against tapeworms, is recommended in the following doses: dogs, 2 to 6 gm.; lambs, 4 gm.; chickens, 1 gm.; cats, 0.6 to 1 gm.

Oil of Chenopodium for the control of roundworms is recommended in the following doses: dogs and hogs, 0.1 gm./kg. of body weight; cats, 0.05 gm./kg. of body weight.

Carbon tetrachloride is recommended for use in various animals in the following doses: dogs and cats, 0.3 cc./kg. of body weight; horses, 25 to 50 cc. for each 1000 lb. animal; sheep, 4 to 10 cc.; cattle, 10 to 30 cc.; and pigs, 0.6 cc./kg. of body weight.

The recommended anthelmintic dose of tetrachloroethylene for dogs is 0.2 cc./kg. of body weight. Lambs weighing 30 to 60 lbs. may be given 8 to 15 cc. of a mixture of equal part of tetrachloroethylene and mineral oil; adult sheep and goats and calves up to 100 to 150 lbs. are given 20 to 30 cc. of the mixture.

N-butyl chloride is recommended for the removal of ascarids, hookworms and whipworms in dogs in doses ranging from 0.1 to 2 or 3 cc./kg. of body weight and is reported to be well tolerated.

Hexylresorcinol is recommended in veterinary medicine as an anthelmintic for hookworm and roundworm infections in dogs. Dogs weighing 10 to 30 lbs. should receive about 0.6 gm. doses; and 20 to 50 lb. dogs, about one gram doses.

Phenothiazine is recommended as an anthelmintic for a number of species of animals and poultry. In sheep the recommended dose ranges from 0.25 gm./lb to 0.5 gm./lb. For swine, the dose ranges from 0.1 to 0.5 gm./lb. In calves, the dose ranges from 0.44 to 1.1 gm./lb. In poultry, the dose ranges from 0.05 to 1 gm./lb.

Nicotine sulfate is administered to poultry for the control of large roundworms and cecal worms in a dose for each bird comprising about 0.12 cc. of a 40 per cent nicotine sulfate solution.

Santonin is recommended for the control of roundworms in the following doseages: hogs, 4 to 8 gm.; dogs, 0.016 to 0.2 gm.; and cats, 0.006 to 0.003 gm.

The known substances having an anthelmintic action can be used in proportions to provide the usual dose but, when desired, lower doses may be employed. In view of the foregoing, it is seen that the proportion of the diphenylmethane substance to the other anthelmintic substance in my compositions may be varied to a considerable extent.

In the case of a composition for use in poultry comprising 2,2'-dihydroxy-5,5'-dichlorodiphenylmethane and phenothiazine the ratio varies from one part of 2,2'-dihydroxy-5,5'-dichlorodiphenylmethane to 0.5 to 10 parts of phenothiazine.

In the case of a composition comprising 2,2'-dihydroxy-5,5'-dichlorodiphenylmethane and oil of chenopodium for use in dogs, the ratio varies from one part of 2,2'-dihydroxy-5,5'-dichlorodiphenylmethane to 0.05 to 0.5 part of oil of chenopodium.

In the case of a composition comprising 2,2'-dihydroxy-5,5'-dichlorodiphenylmethane and arecoline hydrobromide, the ratio is 1 to about 0.007.

In the case of a composition comprising 2,2'-dihydroxy - 5,5 '- dichlorodiphenylmethane and santonin, the ratio is about 1 to 0.01.

In the case of a composition of 2,2'-dihydroxy-5,5'-dichlorodiphenylmethane and N-butyl chloride, the ratio varies from one part of 2,2'-dihydroxy-5,5'-dichlorodiphenylmethane to about 0.5 to 10 parts of N-butyl chloride.

In the case of a composition of 2,2'-dihydroxy-3,5,6-3',5',6' - hexachlorodiphenylmethane and phenothiazine, the ratio varies from one part of 2,2'-dihydroxy-3,5,6,3',5',6' - hexachlorodiphenylmethane to 2 to 4 parts of phenothiazine.

In the case of a composition of 2,2'-dihydroxy-3,5,6,3',5',6' - hexachlorodiphenylmethane and nicotine sulfate for use in poultry, the ratio is about one part of 2,2'-dihydroxy-3,5,6,3',5',6'-hexachlorodiphenylmethane to 0.1 to one part of nicotine sulfate.

A composition especially useful in poultry comprises a mixture including effective non-toxic doses of 2,2'-dihydroxy - 5,5' - dichlorodiphenylmethane or 2,2' - dihydroxy-3,5,6,3',5',6' - hexachlorodiphenylmethane, phenothiazine and nicotine sulfate.

In view of the foregoing, it is readily seen that the diphenylmethane substances and other anthelmintic substances in my veterinary anthelmintic compositions can be expressed as proportions comprising ratios of from one part of the diphenylmethane substance to from about 0.01 to about 10 parts of the other substance having an anthelmintic action.

It is obvious that the preceding descriptions are intended to be illustrative only and they may be varied or modified to a considerable extent without departing from the spirit of the invention or sacrificing the advantages thereof. I do not, therefore, intend to limit my invention to the specific embodiment herein set forth except as indicated in the appended claims.

The present application is a continuation-in-part of my application S. N. 134,615, filed December 22, 1949, which is a division of my application S. N. 592,920, filed May 9, 1945.

I claim:

1. A veterinary anthelmintic composition containing as one of the essential active ingredients, a diphenylmethane substance represented by the following formula:

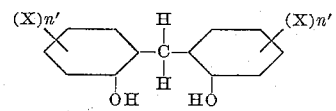

in which X represents a halogen selected from the group consisting of chlorine and bromine and $n'$ is a small whole number of from 1 to 4, and wherein one of the halogens on each of the rings is in the 5 position and wherein any additional halogen substituents are arranged symmetrically, and as another essential active ingredient, at least one other substance having an anthelmintic action, said ingredients being present in the ratio of about one part of the diphenylmethane substance to said other substance falling within the range of from about 0.01 to about 10.0 parts.

2. A veterinary anthelmintic composition which contains as one of the essential active ingredients, a diphenylmethane substance represented by the following formula:

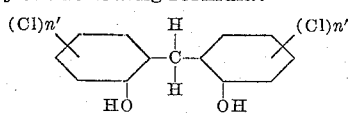

in which $n'$ is a small whole number of from 1 to 4 wherein one of the chlorine substituents on each of the benzene rings is in the 5 position and wherein any additional chlorine substituents are arranged symmetrically, and as another essential active ingredient, at least one other substance having an anthelmintic action, said ingredients being present in the ratio of about one part of the diphenylmethane substance to said other substance falling within the range of from about 0.01 to about 10.0 parts.

3. A veterinary anthelmintic composition which contains as one of the essential active ingredients a diphenylmethane substance represented by the following formula:

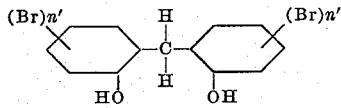

in which $n'$ is a small whole number of from 1 to 4, wherein one of the bromine substituents on each of the benzene rings is in the 5 position and wherein any additional bromine substituents are arranged symmetrically, and as another essential active ingredient, at least one other substance having an anthelmintic action, said ingredients being present in the ratio of about one part of the diphenylmethane substance to said other substance falling within the range of from about 0.01 to about 10.0 parts.

4. A veterinary anthelmintic composition which contains as an essential active ingredient a diphenylmethane substance represented by the following formula:

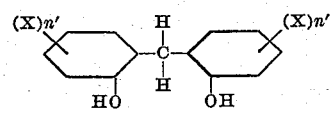

in which X represents a halogen selected from the group consisting of chlorine and bromine and $n'$ is a whole number of from 1 to 4 and wherein one of the halogens on each of the rings is in the 5 position and wherein any additional halogen substituents are arranged symmetrically, said diphenylmethane being present in a quantity to provide a dose falling within the range of from about 30 mg./kg. to 300 mg./kg. and as another essential active ingredient at least one other substance having an anthelmintic action in an amount sufficient alone to produce an anthelmintic effect and less than that which alone produces toxic effects.

5. A veterinary anthelmintic composition which contains as one of the essental active ingredients, a diphenylmethane substance represented by the following formula:

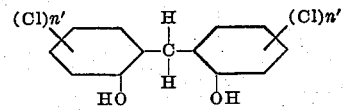

in which $n'$ is a small whole number of from 1 to 4 wherein one of the chlorine substituents on each of the benzene rings is in the 5 position and wherein any additional chlorine substituents are arranged symmetrically, said diphenylmethane being present in a quantity to provide a dose falling within the range of from about 30 mg./kg. to 30 mg./kg. and as another essential active ingredient at least one other substance having an anthelmintic action in an amount sufficient alone to produce an anthelmintic effect and less than that which alone produces toxic effects.

6. A veterinary anthelmintic composition which contains as one of the essential active ingredients, a diphenylmethane substance represented by the following formula:

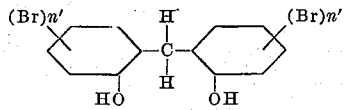

in which $n'$ is a small whole number of from 1 to 4 wherein one of the bromine substituents on each of the benzene rings is in the 5 position and wherein any additional bromine substituents are arranged symmetrically, said diphenylmethane being present in a quantity to provide a dose falling within the range of from about 30 mg./kg. to 300 mg./kg. and as another essential active ingredient at least one other substance having an anthelmintic action in an amount sufficient alone to produce an anthelmintic effect and less than that which alone produces toxic effects.

7. A veterinary anthelmintic composition which contains as one of the essential active ingredients 2,2'-dihydroxy-5,5'-dichlorodiphenylmethane in a quantity to provide a dose of from about 50 mg./kg. to 300 mg./kg. and as another essential active ingredient at least one other substance having an anthelmintic action in an amount sufficient alone to produce an anthelmintic effect and less than that which alone produces toxic effects.

8. A veterinary anthelmintic composition which contains as one of the essential active ingredients, 2,2'-dihydroxy - 3,5,6,3',5',6'-hexachlorodiphenylmethane in a quantity to provide a dose of from about 30 mg./kg. to 60 mg./kg. and as another essential active ingredient at least one other substance having an anthelmintic action in an amount sufficient alone to produce an anthelmintic effect and less than that which alone produces toxic effects.

9. A veterinary anthelmintic composition containing as the essential active ingredients 2,2'-dihydroxy - 5,5 '- dichlorodiphenylmethane and phenothiazine.

10. A veterinary anthelmintic composition containing as the essential active ingredient 2,2'-dihydroxy - 3,5,6,3',5',6' - hexachlorodiphenylmethane in a quantity to provide a dose of from about 30 mg./kg. to 60 mg./kg. and phenothiazine.

11. A veterinary anthelmintic composition containing as the essential active ingredient 2,2'-dihydroxy-5-5'-dichlorodiphenylmethane in a quantity to provide a dose of from about 50 mg./kg. to 300 mg./kg. and oil of chenopodium.

ARTHUR HENRY CRAIGE, JR.

References Cited in the file of this patent

UNITED STATES PATENTS

| Number | Name | Date |
| --- | --- | --- |
| 1,658,719 | Hardy | Feb. 7, 1928 |
| 1,707,181 | Weiler | Mar. 26, 1929 |
| 1,839,970 | Konantz | Jan. 5, 1932 |
| 2,250,480 | Gump | July 29, 1941 |
| 2,272,267 | Gump | Feb. 10, 1942 |
| 2,334,408 | Gump et al. | Nov. 16, 1943 |
| 2,353,725 | Gump | July 18, 1944 |

OTHER REFERENCES

Cade, Soap and Sanitary Chemicals, Volume 20, February 1944, pages 111 to 115.